(12) United States Patent
Baker

(10) Patent No.: US 6,298,574 B1
(45) Date of Patent: Oct. 9, 2001

(54) BITUMINOUS PAVING DEPTH GAUGE

(75) Inventor: Richard L. Baker, Colombia, MO (US)

(73) Assignee: APAC Inc., Atlanta, GA (US)

(*) Notice: Subject to any disclaimer, the term of this patent is extended or adjusted under 35 U.S.C. 154(b) by 0 days.

(21) Appl. No.: 09/058,797

(22) Filed: Apr. 13, 1998

(51) Int. Cl.[7] ................................................. G01B 5/06
(52) U.S. Cl. ........................... 33/834; 033/1 H; 033/624
(58) Field of Search ............................ 33/834, 700, 713, 33/717, 718, 719, 721, 722, 726, 730, 832, 833, 521, 1 H, 613, 624, 625

(56) References Cited

U.S. PATENT DOCUMENTS

| | | | |
|---|---|---|---|
| 968,996 | * | 8/1910 | Stackhouse ........................... 33/833 |
| 3,392,582 | * | 7/1968 | Pick et al. ............................. 33/722 |
| 4,392,305 | * | 7/1983 | Nix et al. .............................. 33/834 |
| 4,760,847 | * | 8/1988 | Vaillancourt .......................... 33/833 |

* cited by examiner

Primary Examiner—Christopher W. Fulton
(74) Attorney, Agent, or Firm—Frank J. Kowalski; Martin Connaughton; Vernon F. Venne

(57) ABSTRACT

A top reading bituminous paving depth gauge is used to determine the thickness of paving layers. The gauge comprises a depressible rod operatively associated when a rod support system comprising an upper portion having a graduated measuring gauge fixed on the rod support system and a bottom support devise fixed to the lower end of the rod support system. The bottom or the support device acts as a foot for the measuring gauge and also acts to receive the lower portion of the depressible rod. The top reading bituminous paving depth gauge operates without any washers on the measuring depressible rod to prevent false measurements due to the presence of large aggregates.

13 Claims, 2 Drawing Sheets

BITUMINOUS PAVING DEPTH GAUGE

BACKGROUND OF THE INVENTION

1. Field or the Invention

The present invention pertains to instruments to depth measurement or loosely laid pavement mixtures and more particularly to depth measurement instruments used to measure a hot bituminous pavement layer while paving before compaction to determine whether the proper depth or pavement has been set in place.

2. Related Prior Art

Presently, measuring the mat thickness of a bituminous paving layer before compaction is normally done by a very simple portable device. This device usually consists of a one quarter inch rod that has an adjustable washer. The rod with washer fixed in place is inserted into the recently laid bituminous pavement mixture of aggregates and asphalt cement. The rod may be several feet long so that it is easy to handle and can measure significant depths of pavement. The rod may also be threaded so that a lock nut can be used in conjunction with the washer. The washer may be fixed to the nut so that it will not slide when the nut is screwed in place. In most instances, the washer is used in conjunction with a set screw. This arrangement avoids the problem of asphalt tar filling in the threads and preventing movement to the nut.

A ruler normally is used to measure the distance from the end of the rod to the washer to set the desired mat thickness. The washer is then locked down on the rod usually by means of a set screw. The person measuring the mat or bituminous paving layer thickness then walks where the mat has just been laid and shoves the rod into the bituminous paving layer. The rod is pushed into the bituminous paving to see if the rod goes to or exceeds the distance of the washer from the end of the rod. If the washer does not touch the mat, the thickness of the mat is increased. If the bituminous paving exceeds the depth of the washer, the thickness is decreased.

One problem associated with such a device comes from the composition of the paving material itself. This problem occurs primarily because of the size of some of the aggregates used to make certain types of bituminous paving. In some types of bituminous paving the larger aggregates may be one and one half inches in diameter and larger in size. The washer generally is two inches in diameter. If the rod is pushed into the bituminous paving when the mat depth exceeds the desired depth, the washer may be held up by one of these large aggregates before the rod reaches the bottom of the paving layer. This can lead to an inaccurate reading witch results in a false measurement of the thickness of the mat.

When the washer hits a large aggregate and fails to reach the bottom of the pavement layer and an inaccurate measurement is taken. In one situation, the spreader operator may mistakenly believe the depth to be proper and continues to lay down a mat too thick. Or, possibly in another situation, the operator may receive an indication of the depth being too thick. However, since the washer was held up by a large aggregate, the operator would correct for a paving layer having a thickness of too great of a depth by the measured amount. Unfortunately, a correction was made but not great enough because the depth gauge did not measure the true depth. This would result in the amount of reduction to be too small and result in a loss because of the error in the measurement obtained by the rod and washer device. In both of these cases, too much bituminous is being laid and costs can increase by as much as twenty percent.

SUMMARY OF THE INVENTION

The method and apparatus of the present invention eliminates the problem of faulty depth measurement encountered by prior art depth measurement gauges. The bituminous paving depth gauge of the present invention eliminates the need of the fixably attached washer that in some cases can prevent the rod from going down to the complete depth of the mat.

The method of the present invention for measuring the paving layer depth in a bituminous paving operation includes inserting a rod member into the pavement layer, aligning an indicator on the rod with a graduated measuring section on a support member and reading the depth. The rod member has an indicator at its top and a gradually narrowing end for insertion into the paving layer. The gradually narrowing end is designed so that the rod member can easily be inserted into the uncompacted bituminous paving mixture by pushing the aggregates out of the way, allowing the tip of the rod to touch the prepared surface for receiving the pavement. The rod member is supported by a support device having a top portion and a bottom portion. The top portion includes a measuring section having predetermined graduations. This measuring section acts in cooperation with the indicator to provide a measurement of the pavement layer or mat. The bottom portion has support sections for receiving and sildeably holding the rod member. Reading a depth measurement is done according to the position of the indicator with respect to the measuring section. The method for measuring the paving layer depth in a bituminous paving operation may also include preventing the support device from sinking into the paving with a base member mounted on the bottom portion of the support device.

The apparatus of the present invention provides a top reading bituminous paving depth gauge to determine the thickness of paving layers. The gauge of the present invention includes a depressible rod operatively associated with a structural rod support system. The depressible rod has a bottom portion that is slideably mounted in the rod support system. The rod support system has an upper portion and a lower portion. The upper portion includes a graduated measuring gauge fixed on the rod support system. The lower portion has a bottom support device fixed to the lower end of the rod support system. The bottom support device acts as a foot for the measuring gauge. This foot rests on the bituminous paving when the measuring gauge is set in place to measure the depth of the mat. The bottom support device also acts to receive the lower portion of the depressible rod. The top reading bituminous paving depth gauge operates without any washers on the measuring depressible rod to prevent false measurements due to the presence of large aggregates. The upper portion with its graduated measuring gauge fixed on the rod support system operates in conjunction with an indicator on the top of the depressible rod to provide a mark for accurately measuring the depth of the bituminous paving. The indicator is at zero on the measuring gauge when the bottom of the depressible rod is flush with the foot of the bottom support device.

The rod portion of the present invention has no washer that would prevent the rod from going the complete depth of the mat. The rod is preterably five feet long and has a cone shaped bottom to allow insertion into the bituminous paving layer or mat. With the narrowed tip of the cone shaped bottom at the end of the rod, the rod is pushed into the bituminous paving with little effort by the operator of the bituminous layer measuring device. The measuring of the thickness is done from the top of the device of the present invention. When the rod enters the paving the top of the rod lines up with the gauge which is in one quarter inch increments giving an accurate measurement of the mat thickness. The foot on the bottom of the rod support portion of the device of the present invention is preferably three inches by three inches and keeps from sinking into the bituminous paving. The total length of the bituminous paving depth gauge of the present invention is approximately five feet. In this manner the measuring portion of the apparatus of the present invention is places at eye level for easy reading of the depth of the mat. The bituminous paving depth gauge of the present invention is preferably made from aluminum so that is light weight and portable. Thus, it may be carried in a vehicle or in a case mounted on the spreader which would give personnel easy access to the device of the present invention for measuring the bituminous paving layer thickness or depth.

DESCRIPTION OF THE PREFERRED EMBODIMENT

The apparatus of the present invention eliminates the problem of faulty depth measurement encountered by prior art depth measurement gauges by removing the need of the fixably attached washer of prior art devices. The present invention provides a top reading bituminous paving depth gauge for measuring the thickness of paving layers. This gauge has a depressible rod operatively associated with a support system. The depressible rod may have a bottom portion with a pointed tip that fits in the rod support system and may have an indicator positioned at some point on the rod. The rod support system has a portion including a graduated measuring section fixed on the rod support system and a portion including a bottom support device fixed to its lower end. The graduated measuring section may be in any location of the support system to act in cooperation with the indicator and its position on the depressible rod.

The depressible rod portion of the present invention has no washer that would prevent the rod from going the complete depth of the mat. The rod is preferably five feet long and has a cone shaped bottom to allow insertion into the bituminous paving layer or mat. With the narrowed tip of the cone shaped bottom at the end of the rod, the rod is pushed into the bituminous paving with little effort by the operator of the measuring device.

Figure 1:
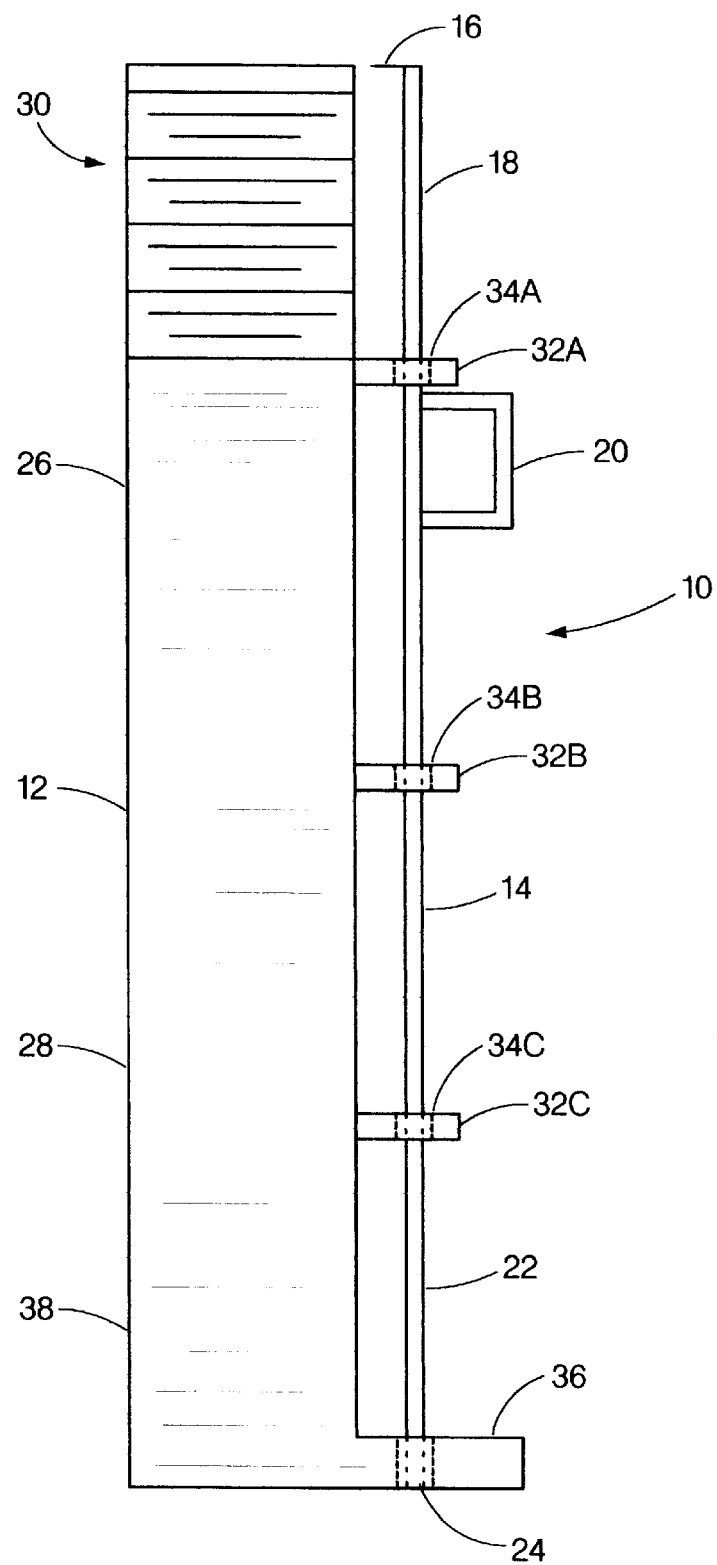
FIG. 1 is a side view of the bituminous paving layer depth gauge of the present invention.

Referring now to FIG. 1, a side view of a bituminous paving depth gauge 10 of the present invention is illustrated as having a support system 12 and a depressible rod 14. The movably mounted depressible rod 14 is shown with an indicator 16 at its top end 18 and a handle 20 located closer to the middle or rod 14. Although handle 20 is designed for ease of movement in inserting rod 14 into the paving mat, handle 20 is located towards the middle of rod 14 for balance so that paving depth gauge 10 may be carried by handle 20 when moved from one measuring location to the next. Lower end 22 or rod 14 is illustrated as narrowing to a rounded point 24.

Depressible rod 14 is preferably made or a $3/16$" steel rod for providing the maximum amount of strength while adding the minimum amount of size and weight to paving depth gauge 10. However, it is to be noted that any material may be used as long as it is strong and heat resistant so that it may be inserted repeatedly into the hot bituminous paving mixture, a mixture of asphalt cement and hot aggregates, without any deleterious ettects. In addition, the material for the depressible rod has a secondary requirement, that is, it must be able to be shaped or reduced in size to narrowed rounded point 24 without compromising its strength. The strength and heat resistance or the material refer to the ablilty of depressible rod 14 to be able to move loosely piled aggregates out of the way as it is pushed to the earth surface where the bituminous paving layer begins. In this respect, the material from which depressible rod 14 is made must retain its rigidness despite the heat of the bituminous paving mixture.

Depressible rod 14 has handle 20 located close to its middle. Handle 20 is positioned for balance to facilitate the moveability of depressible rod 14. Positioning handle 20 in this manner allows depressible rod 14 to slide from its zero position to its maximum depth reading. Handle 20 may also serve as the carrying device for transporting paving depth gauge 10 between measurement locations. In this regard, handle 20 is preferably four inches long to allow a person to grip handle 20 comfortably. In this regard, handle 20 may be knurled to fit finger spaces to provide a comfortable grip. Handle 20 is preferably welded onto rod 14 and may be made of a steel rod of the same diameter as rod 14. Thus, the added strength permits the entire depth measuring gauge 10 to be lifted by handle 20. support system 12 includes a top portion 26 and a bottom portion 28. Top portion 26 of support system 12 includes a graduated section 30 having graduated marks, ranging from zero to a predetermined number. The graduated marks of measuring section 30 are used in conjunction with indicator 16 to provide an easily readable gauge for viewing the depth of the bituminous pavement. In the preferred embodiment, twelve inches of graduated marks are preferred. The graduated marks are preferably every one quarter of an inch although any spacing may be used to provide a graduated measurement of the depth of the bituminous paving. Zero for graduated section 30 preferably occurs at the very top of top portion 26 of support system 12 in the preferred embodiment. This location was chosen so that the portion where the depth of the mat is read would be approximately eye level and the depth could easily be called out to the operator. The zero mark on graduated section 30 is the position of indicator 16 of depressible rod 14 when the tip of rounded point 24 at lower end 22 of depressible rod 14 is flush with the bottom support system 12 when it is resting on the top of the bituminous paving layer. The zero mark for graduated section 30 may be at any position on support system 12 as long as it is coordinated with the position of indicator 16 of rod 14.

Support system 12 includes brackets 32A, 32B and 32C. The spacing between brackets 32A, 32B and 32C may be sized to provide balance in the instrument, however, the spacing between brackets 32A and 32B must be adequate to permit handle 20 to travel sufficient distance for indicator 16 to traverse all the graduated marks or graduated measuring section 30. Brackets 32A, 32B and 32C include holes 34A, 34B and 34C, respectively, drilled in each bracket to permit travel of rod 14 to the bottom of the bituminous paving mat.

At a midpoint of support system 12, a carrying handle or cutout (not shown) may be provided so that measuring gauge 10 may be carried.

Bottom portion 28 includes a bottom support device or base 36 fixed to its lower end 38. Bottom support device or base 36 provides a stop for measuring gauge 10 to provide an area upon which it may rest. Base 36 also acts to receive lower portion 22 of depressible rod 14. Base 36 rests on the bituminous paving when bituminous paving layer depth gauge 10 is set in place for measuring. Upper portion 26 with its graduated measuring section 30 fixed on top portion 26 rod support system 12 operates in conjunction with indicator 16 on top end 18 of depressible rod 14 to provide a mark for accurately measuring the depth of the bituminous paving. The indicator is at zero on measuring portion 30 when rounded point 24 of depressible rod 14 is flush with the bottom or base 36 of support system 12. The reading or the thickness measurement is done from top portion 26 of the device of the present invention. When rod 14 enters the paving, the top or indicator 16 of rod 14 lines up with graduated portion 30. As rod 14 is inserted into the pavement mat, the indicator is aligned with the graduated marks of section 30. With the alignment being done at eye level, an accurate measurement of the mat thickness is readily obtained. The foot on the bottom of the rod support portion of the device of the present invention, base 36, is preferably three inches by three inches. This size keeps the bituminous paving depth gauge 10 of the present invention from sinking into the bituminous paving.

The total length or bituminous paving depth gauge 10 of the present invention when set at zero is approximately five feet. In this manner the measuring portion of the apparatus of the present invention is placed at eye level for easy reading of the depth or the mat. Bituminous paving depth gauge 10 of the present invention is preferably made from aluminum so that it is light weight and portable. Thus, it may be carried in a vehicle or in a case mounted on the spreader. This arrangement gives personnel easy access to the apparatus of the present invention for measuring the bituminous paving layer thickness or depth.

Figure 2:
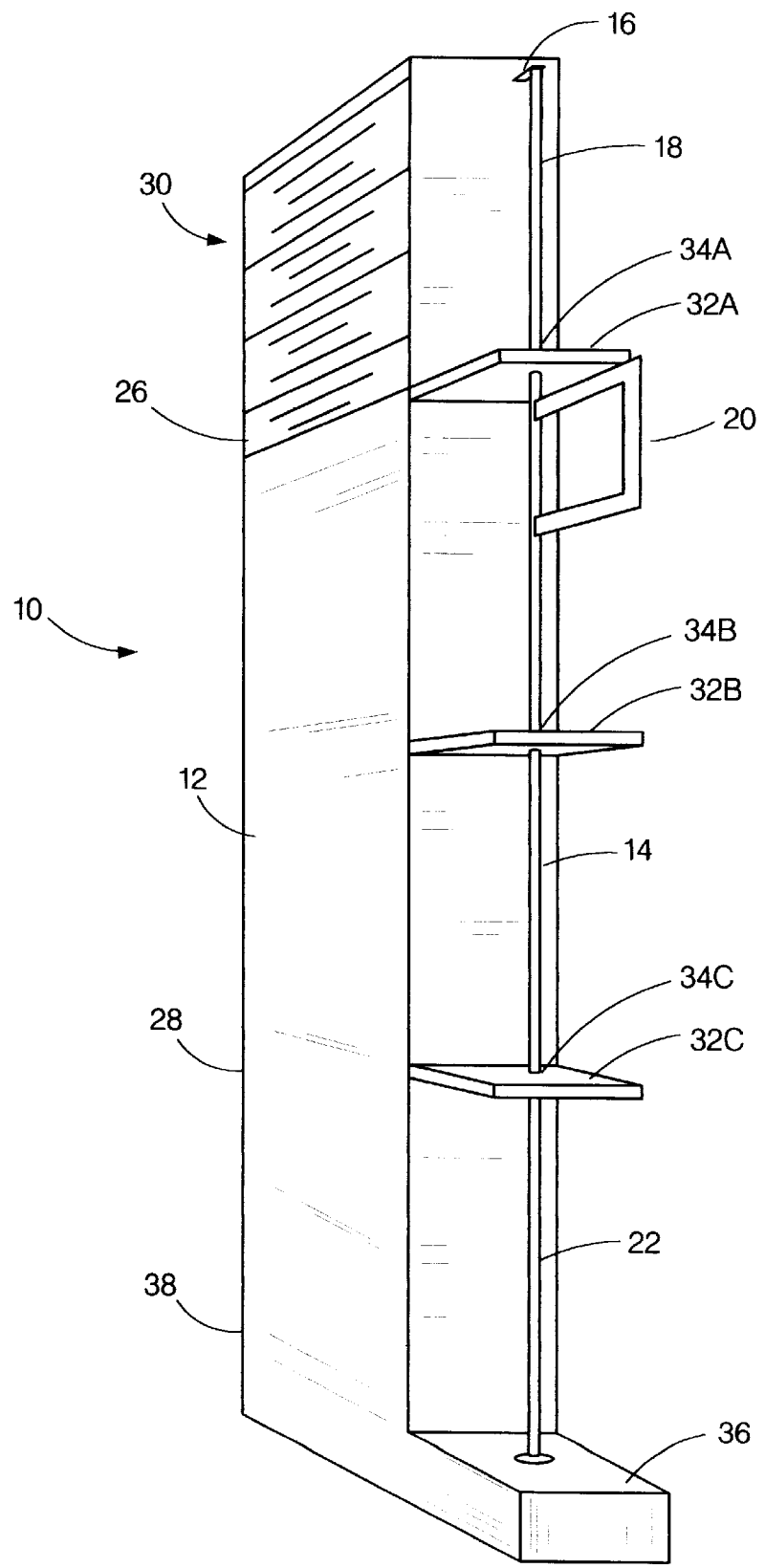
FIG. 2 is an isometric view of the bituminous paving layer depth gauge of FIG. 1.

Referring now to FIG. 2, an isometric view of the bituminous paving depth gauge 10 of FIG. 1 is illustrated. As can be seen, depressible rod 14 fits closely but loosely in brackets 32A, 32B and 32C. This is to allow indicator 16 on rod 14 to move or slide easily between the zero point and the maximum depth point in graduated section 30. However, depressible rod 14 its snugly enough in brackets 32A, 32B and 32C so that depth gauge 10 may be easily carried from measuring point to measuring point without banging or flopping back and forth. Depressible rod 14 is shown as being approximately one inch from support system 12. This distance is merely for convenience and may be any distance as long as rod 14 moves freely vertically without interference from support system 12.

The present invention provides a top reading bituminous paving depth gauge for measuring the thickness of paving layers. The measuring device of the present invention as described has a depressible rod operatively associated with a support system. The depressible rod fits in the rod support system. The rod support system has an upper portion having a graduated measuring gauge and a lower portion including a bottom support device fixed to its lower end upon which the support system rests.

As has been illustrated, the depressible rod portion of the present invention has no washer that would prevent the rod from going the complete depth of the mat. The rod is preferably five feet long and has a cone shaped bottom to allow insertion into the bituminous paving layer or mat. With the narrowed tip of the cone shaped bottom at the end of the rod, the rod is pushed into the bituminous paving with little effort by the operator of the device. The support system includes brackets through which the rod slides. The support system also includes a graduated mark section, preferably at eye level, which remains stationary while the rod is inserted into the pavement mat.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A paving layer depth measuring apparatus comprising:
   a rod member having a gradually narrowing end to facilitate insertion into the paving layer;
   a support device including a measuring section having predetermined graduations and having support sections for receiving and slideably holding said rod member; and
   a holding device mounted on said rod member to assist movement of said rod member relative to said support device into the paving layer.

2. The paving layer depth measuring apparatus according to claim 1 wherein said rod member includes an indicator device which operates in cooperation with said measuring section of said support device.

3. The paving layer depth measuring apparatus according to claim 1 wherein said predetermined graduations on said measuring section of said support device includes graduation marks every quarter inch.

4. The paving layer depth measuring apparatus according to claim 1 wherein said support device is made of aluminum.

5. The paving layer depth measuring apparatus according to claim 1 wherein said support device also includes a carrying device for being held by an operator.

6. The paving layer depth measuring apparatus according to claim 1 also including:

base member mounted on said bottom portion of said support device to prevent said depth measuring apparatus from sinking into the paving.

7. The paving layer depth measuring apparatus according to claim 6 wherein said rod member includes indicator device which operates in cooperation with said measuring section of said support device.

8. The paving layer depth measuring apparatus according to claim 6 wherein said base member mounted on said bottom portion of said support device is approximately three inches by three inches.

9. The paving layer depth measuring apparatus according to claim 6 wherein said rod member includes indicator device which operates in cooperation with said measuring section of said support device.

10. The paving layer depth measuring apparatus according to claim 6 wherein said predetermined graduations on said measuring section of said support device includes graduation marks every quarter inch.

11. The paving layer depth measuring apparatus according to claim 6 wherein said support device is made of aluminum.

12. The paving layer depth measuring apparatus according to claim 6 wherein said support device also includes a holding device for being held by an operator.

13. A paving layer depth measuring apparatus comprising:

rod member having a gradually narrowing end for insertion into the paving layer, a holding device for assisting movement and an indicator device;

support device having a top portion, a bottom portion and said holding device for being held by an operator, said top portion including a measuring section having predetermined graduations including graduation marks every quarter inch, said measuring section operates in cooperation with said indicator device of said rod member, said bottom portion having support sections for receiving and slideably holding said rod member;

base member mounted on said bottom portion of said support device to prevent said depth measuring apparatus from sinking into the paving.

* * * * *